United States Patent
Williams

[15] 3,689,549
[45] Sept. 5, 1972

[54] PRODUCTION OF SULFONYL ISOCYANATES FROM SULFONAMIDES IN A SULFOLANE SOLVENT

[72] Inventor: Ralph P. Williams, Bartlesville, Okla.

[73] Assignee: Phillips Petroleum Company,

[22] Filed: May 6, 1969

[21] Appl. No.: 822,293

[52] U.S. Cl. ............................................. 260/545 R
[51] Int. Cl. ............................................. C07c 143/84
[58] Field of Search ....................... 260/545 R, 332.1

[56] References Cited

UNITED STATES PATENTS 3,371,114   2/1968   Saylgh et al. .............. 260/545

3,514,469   5/1970   Phillips et al. .......... 260/332.1

OTHER PUBLICATIONS

Fieser et al., Reagents for Org. Syn. Volumes 1 & 2, p. 1967

*Primary Examiner*—Lorraine A. Weinberger
*Assistant Examiner*—Robert Gerstl
*Attorney*—Young and Quigg

[57] ABSTRACT

A sulfonyl isocyanate is prepared by reaction of the sulfonamide in a sulfolane solvent with phosgene. The solvent increases rapidity of the reaction and yields a product of increased purity.

7 Claims, No Drawings

PRODUCTION OF SULFONYL ISOCYANATES FROM SULFONAMIDES IN A SULFOLANE SOLVENT

This invention relates to the production of a sulfonyl isocyanate. It also relates to the reaction of a sulfonamide with phosgene. Further it relates to the use of a sulfolane as a solvent for the reaction.

In one of its concepts, the invention provides a process for the preparation of a sulfonyl isocyanate by reaction of a sulfonamide with phosgene, the reaction being effected advantageously in a sulfolane solvent.

The invention will now be further described, paying particular attention to the gist thereof which is that a sulfolane solvent is used to bring together for appropriate reaction the carbonyl halide and the sulfonamide.

I have now found that by careful selection of solvent, for example, by using a sulfolane rather than a chlorinated benzene, that I can not only improve the rate of reaction, i.e., of phosgenation, but also there is obtained a product of higher purity as evidenced by a shorter melting point range.

It is an object of this invention to produce a sulfonyl isocyanate. It is another object of this invention to perform the reaction of a sulfonamide with a carbonyl halide, e.g., phosgene in an improved manner to obtain a product more rapidly and of higher purity. It is a further object of this invention to provide a solvent for the reaction.

Other aspects, concepts, objects and the several advantages of the invention are apparent from a study of this disclosure and the appended claims.

According to the present invention, a sulfonyl isocyanate is prepared by the reaction of a sulfonamide with a carbonyl halide, e.g., phosgene, employing a sulfolane solvent during the reaction.

Presently, the preferred sulfolane solvent is tetrahydrothiophene 1,1-dioxide.

The sulfolane which can be used as a solvent can be represented by the formula

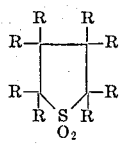

where R is selected from the group consisting of hydrogen and alkyl radicals having one to four carbon atoms, the total number of carbon atoms in each molecule of said sulfolane being within the range of four to about 20, preferably four to eight. Examples of some sulfolanes which are applicable include tetrahydrothiophene 1,1-dioxide (sulfolane),
tetrahydro-2-methylthiophene 1,1-dioxide,
tetrahydro-3-methylthiophene 1,1-dioxide,
tetrahydro-2-ethylthiophene 1,1-dioxide,
tetrahydro-3-ethylthiophene 1,1-dioxide,
tetrahydro-2,3-dimethylthiophene 1,1-dioxide,
tetrahydro-2,4-dimethylthiophene 1,1-dioxide,
tetrahydro-2,5-dimethylthiophene 1,1-dioxide,
tetrahydro-3,4-dimethylthiophene 1,1-dioxide,
tetrahydro-2,5-diethylthiophene 1,1-dioxide,
tetrahydro-3,4-diethylthiophene 1,1-dioxide,
tetrahydro-2,2-dimethyl-5-isopropylthiophene 1,1-dioxide,
tetrahydro-3-propyl-4-isobutylthiophene 1,1-dioxide,
tetrahydro-2,3,4,5-tetrabutylthiophene 1,1-dioxide,
tetrahydrooctamethylthiophene 1,1-dioxide,
and the like, and mixtures thereof.

The particular sulfolane selected by one skilled in the art in possession of this disclosure having studied the same may in some cases depend upon the particular sulfonamide selected and upon other conditions which are within his control.

The carbonyl reactant now preferred is phosgene.

Sulfonamide reactants which can be used will have at least one $-SO_2NH_2$ group and include those which generally are applicable to the formation of sulfonyl isocyanates in a satisfactory manner.

The sulfonamides which have only one or two carbon atoms, e.g., methanesulfonamide are applicable. There can be present olefinic unsaturation in the sulfonamide.

U.S. Pat. No. 2,666,787, granted Jan. 19, 1954, discloses the production of a sulfonyl isocyanate by reacting phosgene at an elevated temperature with a sulfonamide. The reaction is effected in trichlorobenzene according to the example of that patent.

More generally, the sulfonamides which can be used are those in which the $-SO_2NH_2$ group is attached to a hydrocarbon radical, such as a straight or branched aliphatic hydrocarbon radical, containing from one to about 24 carbon atoms, or an aromatic mono- or polynuclear hydrocarbon radical such as phenyl, tolyl, naphthyl and the like. Alicyclic and aralphatic hydrocarbon radicals may also be present.

The radical attached to the $-SO_2NH_2$ group may also contain inert substituents such as tertiary amino groups, keto groups or ether or thioether groups. Heterocyclic sulfonamides wherein the heteroatoms are inert can also be used, e.g., compounds having the furan, thiophene, or pyridine nucleus.

The solvent can be used according to the invention in varying quantities. Generally, the weight ratio of sulfolane to sulfonamide will be within the range of from about 0.25:1 to about 20:1 and is now preferred to be in the range 1:1 to 12:1.

The phosgene should be employed in an amount sufficient to obtain a desired degree of reaction and preferably should be employed in an amount sufficient to provide at least one molecule, e.g., one to two molecules of phosgene for each sulfonamide group to be converted to a sulfonyl isocyanate group.

The reaction can be carried out by passing phosgene into a solution or suspension of a sulfonamide in sulfolane or by adding the sulfonamide as such or as a solution or suspension in a sulfolane to a solution of phosgene in sulfolane. Presently, the reaction is preferably obtained by passing phosgene into a solution or suspension of a sulfonamide in the selected sulfolane.

This is accomplished at a reaction temperature which can vary over a wide range but which generally will be within the range of from about 75° to about 225° C., now preferably in the range of from about 100° to about 200° C., depending somewhat upon the reactants and solvents selected as one skilled in the art having studied this disclosure will understand.

As noted, the reaction rate which can be obtained with the sulfolane solvent of the invention is much improved over that of, say, the chlorinated hydrocarbon earlier used. See the example. Generally, the reaction time which can vary over a broad range will depend in part upon the reaction temperature but will generally be within the range of from about 1 minute to 24 hours, usually about 30 minutes to 8 hours, depending, of course, upon the quantity of reactants to be reacted as well as on other related factors.

Ordinarily, the phosgenation reaction will be carried out at approximately atmospheric pressure but it can be carried out at an elevated pressure, say, up to about 100 pounds per square inch or even higher. Hydrogen chloride produced in the reaction ordinarily is to be vented from the reactor. This can be done on a continuous or discontinuous basis.

Similarly, the reaction can be carried out on a batch or continuous basis. The reactants can be brought together incrementwise or on a continuous basis.

The sulfonyl isocyanate products can be isolated from the reaction mixtures obtained by conventional techniques, for example, by distillation followed by crystallization.

EXAMPLE 1,4-Cyclohexanedisulfonamide, prepared by the reaction of 1,4-cyclohexanedi(sulfonyl chloride) with aqueous ammonia, was converted to 1,4-cyclohexanedi(sulfonyl isocyanate) by reaction with phosgene in sulfolane (tetrahydrothiophene 1,1-dioxide). A stream of phosgene in excess of that undergoing reaction was bubbled for 7 hours through a glass frit beneath the surface of a stirred solution of 63.2 g. (0.262 mole) of 1,4-cyclohexanedisulfonamide in 500 ml. of sulfolane maintained at 175°–180° C., at atmospheric pressure. Sulfolane was then removed by maintaining the reaction mixture under a pressure of 10 mm. Hg while heating the mixture to 160° C., resulting in 84.6 g. of liquid residue which solidified on standing. The residue was taken up in hot o-dichlorobenzene, the hot mixture was filtered, and the filtrate was chilled. From the chilled filtrate was filtered 34.8 g. of 1,4-cyclohexanedi(sulfonyl isocyanate) melting at 155°–160° C.

In another run, 1,4-cyclohexanedisulfonamide was phosgenated to 1,4-cyclohexanedi(sulfonyl isocyanate) in o-dichlorobenzene. A stream of phosgene comparable to that used in the run above was bubbled for 22 hours through a glass frit beneath the surface of a stirred mixture of 63.2 g. (0.262 mole) of 1,4-cyclohexanedisulfonamide and 12 g. (0.1 mole) of phenyl isocyanate in about 500 ml. of o-dichlorobenzene, at atmospheric pressure. The phenyl isocyanate was employed in view of its known utility as a phosgenation catalyst. As much unreacted 1,4-cyclohexanedisulfonamide remained undissolved in the hot o-dichlorobenzene after this 22-hour reaction period, the phosgenation was continued for an additional 23 hours, making the total time 45 hours. The reaction mixture was allowed to stand overnight, and the dark precipitate was collected on a filter, washed with o-dichlorobenzene followed by ether, and then vacuum dried, giving 53.6 g. of brown solid. Recrystallization from o-dichlorobenzene afforded 38.3 g. of 1,4-cyclohexanedi(sulfonyl isocyanate) melting at 149°–160° C. Another recrystallization yielded 23.2 g. of product melting at 142°–160° C.

Thus, the rate of phosgenation of the disulfonamide was much more rapid in sulfolane than in o-dichlorobenzene. Furthermore, the di(sulfonyl isocyanate) product obtained when sulfolane was used as solvent had a smaller melting point range, indicating its purity to be higher than that of the product isolated from the reaction mixture which resulted when o-dichlorobenzene was used.

Upon study of the foregoing example, it will be noted that certain techniques and modus operandi have been employed. These are now preferred.

It will be especially noted also that in the run in which o-dichlorobenzene was employed as a solvent, there was also employed phenyl isocyanate in view of its known utility as a phosgenation catalyst. Such a catalyst was not employed — in fact, no catalyst was employed — in the reaction described in the first paragraph of the example. The results obtained should be viewed in the light of the use of the phenyl isocyanate in the run of the second paragraph of the example. Further still, it should be noted that in the second run every precaution was taken to obtain the best possible yield. Thus, phosgenation continued for a much longer time than in the first run and whatever reaction would occur was allowed to be completed overnight.

The carbonyl reactant, e.g., carbonyl halide selected will, of course, be one which will function to produce the desired isocyanate.

The sulfolanes which are presently preferred for use as solvents in the process of this invention are tetrahydrothiophene 1,1-dioxide, tetrahydro-2-methylthiophene 1,1-dioxide, tetrahydro-3-methylthiophene 1,1-dioxide, and tetrahydro-2,3-dimethylthiophene 1,1-dioxide.

Sulfonamide reactants presently preferred for use in the process include 1,4-cyclohexanedisulfonamide, 1-dodecanesulfonamide, benzenesulfonamide, and 1,3-benzenedisulfonamide.

Reasonable variation and modification are possible in the scope of foregoing disclosure and the appended claims to the invention the essence of which is that a sulfolane solvent is used in a reaction of a sulfonamide with the carbonyl halide, e.g., the phosgene to form a sulfonyl isocyanate.

I Claim:

1. A process for the production of a sulfonyl isocyanate which comprises reacting at a temperature in the approximate range of 75°–225° C. a sulfonamide with a carbonyl halide which is effective to remove the hydrogen from the amino group and to attach to the nitrogen the CO group, employing as a solvent for the reaction a sulfolane in which said sulfonamide is soluble.

2. A process according to claim 1 wherein the carbonyl halide is phosgene.

3. A process according to claim 1 wherein the sulfolane is at least one, selected from the group of solvents which can be represented by the formula

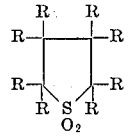

where R is selected from the group consisting of hydrogen and alkyl radicals having one to four carbon atoms, the total number of carbon atoms in each molecule of said sulfolane being within the range of four to about 20, preferably four to eight.

4. A process according to claim 1 wherein the sulfonamide is selected from the group consisting of 1,4-cyclohexanedisulfonamide, 1-dodecanesulfonamide, benzenesulfonamide, and 1,3-benzenedisulfonamide, and the sulfolane is selected from the group consisting of tetrahydrothiophene 1,1-dioxide, tetrahydro-2-methylthiophene 1,1-dioxide, tetrahydro-3-methylthiophene 1,1-dioxide, and tetrahydro-2,3-dimethylthiophene 1,1-dioxide.

5. A process according to claim 1 wherein the sulfonamide is 1,4-cyclohexanedisulfonamide and the sulfolane is tetrahydrothiophene 1,1-dioxide.

6. A process according to claim 1 wherein the reaction temperature is in the approximate range of 100°–200° C. and the reaction time, depending upon the selected temperature, is in the approximate range of 1 minute to 24 hours.

7. A process according to claim 6 wherein the sulfonamide is at least one selected from sulfonamides in which the —SO$_2$NH$_2$ group is attached to a hydrocarbon radical, which can be a straight or branched aliphatic hydrocarbon radical, containing from one to about 24 carbon atoms, or an aromatic mono- or polynuclear hydrocarbon radical and wherein alicyclic and araliphatic hydrocarbon radicals can also be present.

* * * * *